US009520228B2

(12) United States Patent
Liu et al.

(10) Patent No.: US 9,520,228 B2
(45) Date of Patent: Dec. 13, 2016

(54) WIRELESS ENERGY TRANSFER

(71) Applicant: Honeywell International Inc., Morristown, NJ (US)

(72) Inventors: Haiyang Liu, Plymouth, MN (US); Chunbo Zhang, Manhattan Beach, CA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/473,532

(22) Filed: Aug. 29, 2014

(65) Prior Publication Data

US 2014/0368057 A1    Dec. 18, 2014

Related U.S. Application Data

(63) Continuation of application No. 13/015,179, filed on Jan. 27, 2011, now Pat. No. 8,823,214.

(Continued)

(51) Int. Cl.
| | |
|---|---|
| *H01F 27/42* | (2006.01) |
| *H01F 37/00* | (2006.01) |
| *H01F 38/00* | (2006.01) |
| *H01F 38/14* | (2006.01) |
| *H01Q 1/24* | (2006.01) |
| *H02J 7/00* | (2006.01) |
| *H02J 5/00* | (2016.01) |

(Continued)

(52) U.S. Cl.
CPC .............. *H01F 38/14* (2013.01); *H01Q 1/248* (2013.01); *H02J 5/005* (2013.01); *H02J 7/00* (2013.01); *H02J 7/025* (2013.01); *H02J 17/00* (2013.01); *H04B 3/56* (2013.01); *Y10T 29/49016* (2015.01); *Y10T 307/391* (2015.04); *Y10T 307/461* (2015.04); *Y10T 307/484* (2015.04)

(58) Field of Classification Search
CPC .............. H02J 5/005; H02J 7/00; H02J 17/00; H02J 7/025; H01F 38/14
USPC .......... 307/104, 9.1, 149; 455/402, 401, 108
See application file for complete search history.

(56) References Cited

U.S. PATENT DOCUMENTS

| | | | |
|---|---|---|---|
| 6,212,430 B1 | 4/2001 | Kung | |
| 8,022,576 B2 * | 9/2011 | Joannopoulos | ....... B60L 11/182 307/104 |

(Continued)

OTHER PUBLICATIONS

"U.S. Appl. No. 13/015,217, Notice of Allowance mailed Jan. 2, 2015", 7 pgs.

(Continued)

*Primary Examiner* — Rexford Barnie
*Assistant Examiner* — Jagdeep Dhillon
(74) *Attorney, Agent, or Firm* — Schwegman Lundberg & Woessner, P.A.

(57) ABSTRACT

A system includes at least one active energy transfer coil and a first passive energy transfer coil. The active energy transfer coil is configured to couple with a power supply. The at least one active energy transfer coil has an active coupling range. The first passive energy transfer coil is magnetically coupled to the active energy transfer coil and is located within the active coupling range. The first passive energy transfer coil has a passive coupling range. The first passive energy transfer coil is configured to provide energy to a first device located within the passive coupling range and based on energy received from the at least one active energy transfer coil.

10 Claims, 5 Drawing Sheets

Related U.S. Application Data

(60) Provisional application No. 61/298,856, filed on Jan. 27, 2010.

(51) Int. Cl.
  *H02J 7/02* (2016.01)
  *H02J 17/00* (2006.01)
  *H04B 3/56* (2006.01)

(56) References Cited

U.S. PATENT DOCUMENTS

| | | | |
|---|---|---|---|
| 8,178,995 B2 | 5/2012 | Amano et al. | |
| 8,421,274 B2 | 4/2013 | Sun et al. | |
| 8,823,214 B2 | 9/2014 | Liu et al. | |
| 9,024,480 B2 | 5/2015 | Kolavennu | |
| 2009/0072628 A1 | 3/2009 | Cook et al. | |
| 2009/0122842 A1* | 5/2009 | Vavik | H04B 3/56 375/211 |
| 2009/0243397 A1 | 10/2009 | Cook et al. | |
| 2010/0036773 A1 | 2/2010 | Bennett | |
| 2010/0127660 A1* | 5/2010 | Cook | H01Q 1/248 320/108 |
| 2011/0101788 A1* | 5/2011 | Sun | H01F 38/14 307/104 |
| 2011/0133569 A1 | 6/2011 | Cheon et al. | |
| 2011/0156493 A1 | 6/2011 | Bennett | |
| 2011/0181120 A1 | 7/2011 | Liu et al. | |
| 2011/0181121 A1 | 7/2011 | Kolavennu et al. | |
| 2012/0164943 A1 | 6/2012 | Bennett | |
| 2013/0278209 A1 | 10/2013 | Von Novak, III et al. | |

OTHER PUBLICATIONS

"U.S. Appl. No. 13/015,179, Final Office Action mailed Jan. 31, 2014", 9 pgs.

"U.S. Appl. No. 13/015,179, Non Final Office Action mailed Jun. 20, 2013", 13 pgs.

"U.S. Appl. No. 13/015,179, Notice of Allowance mailed Apr. 28, 2014", 8 pgs.

"U.S. Appl. No. 13/015,179, Response filed Mar. 31, 2014 to Final Office Action mailed Jan. 31, 2014", 10 pgs.

"U.S. Appl. No. 13/015,179, Response filed Sep. 20, 2013 to Non Final Office Action mailed Jun. 20, 2013", 10 pgs.

"U.S. Appl. No. 13/015,217, Response filed Sep. 9, 2013 to Non Final Office Action mailed Jun. 7, 2013", 14 pgs.

"U.S. Appl. No. 13/015,217, Advisory Action mailed Mar. 14, 2014", 2 pgs.

"U.S. Appl. No. 13/015,217, Final Office Action mailed Dec. 24, 2013", 12 pgs.

"U.S. Appl. No. 13/015,217, Non Final Office Action mailed Jun. 5, 2014", 12 pgs.

"U.S. Appl. No. 13/015,217, Non Final Office Action mailed Jun. 7, 2013", 10 pgs.

"U.S. Appl. No. 13/015,217, Response filed Feb. 24, 2014 to Final Office Action mailed Dec. 24, 2013", 9 pgs.

"U.S. Appl. No. 13/015,217, Response filed Sep. 14, 2014 to Non Final Office Action mailed Jun. 5, 2014", 10 pgs,.

\* cited by examiner

WIRELESS ENERGY TRANSFER

CLAIM OF PRIORITY

This patent application is a continuation of, and claims the benefit of priority, under 35 U.S.C. Section 120 to U.S. application Ser. No. 13/015,179, filed on Jan. 27, 2011, which claims the benefit of priority, under 35 U.S.C. Section 119(e), to Haiyang Liu et al., U.S. Provisional Patent Application Ser. No. 61/298,856, entitled "WIRELESS ENERGY TRANSFER," filed on Jan. 27, 2010, the benefit of priority of each of which is claimed hereby, and each of which are incorporated by reference herein in its entirety.

BACKGROUND

Wireless devices and systems, such as those used for information communication, rely on battery power. When depleted, batteries are replaced or recharged. Battery replacement is costly and battery recharging typically entails a physical electrical connection with metered line service. A connection with a metered line service requires that the device remain tethered by a cord and this can be inconvenient.

Current technology for wireless power, while it removes the restrictions imposed by a corded connection, is severely limited as to the range of energy transfer. This limitation significantly impairs the widespread adoption of wireless power technology.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
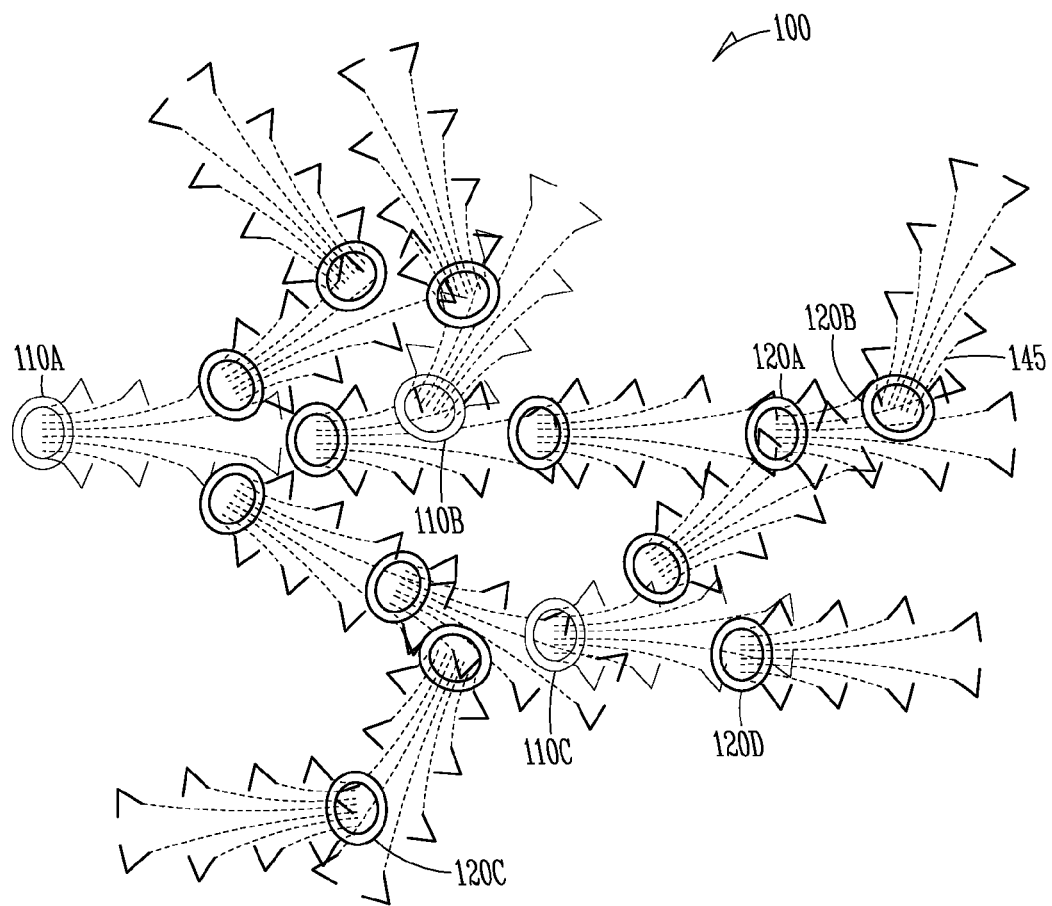
FIG. 1 illustrates a model of a wireless energy transfer system according to one example.

An example of the present subject matter is directed to systems and methods for wireless energy transfer. FIG. 1 illustrates a schematic diagram of system 100 according to one example. System 100, in the example shown, includes a group of active couplers (marked 110A, 110B, and 110C) and a group of passive couplers (some of which are marked 120A, 120B, 120C, and 120D), together forming a mesh including a hybrid of active and passive couplers.

In one example, the couplers shown in system 100 each includes a coiled conductor. Each coupler has an inductance, a resistance, and a capacitance based on the materials, the dimensions, and other parameters of the coil, and consequently, each has a particular resonant frequency. In one example, the couplers of system 100 are configured to each have the same resonant frequency.

A coupler can serve as an end power supply, as a power transfer relay, or as a power source (if coupled to a metered line service, an energy harvester, or a storage device). In the example shown, on-demand energy can be wirelessly transferred throughout the space covered by the couplers.

Energy is transferred among the couplers shown in system 100 by an alternating magnetic field. In one example, nearly all of the energy provided by the source nodes (such as couplers 110A, 110B, or 110C) is recycled within the network unless tapped for use by a load. For example, approximately 90% of the total energy provided to the system is retained in the system and approximately 10% of the energy is lost due to radiative and resistive losses inherent in the couplers.

Active couplers 110A, 110B, and 110C, for example, can be coupled to a signal generator and power amplifier to provide an oscillating electric current to the couplers, which thus produces an alternating magnetic field in the region about each of the couplers. The magnetic field projects axially from the coils shown in the figure and a portion of the magnetic field is shown at region 145. In one example, multiple active coils are configured to contribute energy simultaneously into the network.

Passive couplers 120A, 120B, 120C, and 120D can be stand-alone coils or can be coupled to a load, such as a mobile device.

The couplers shown in FIG. 1 are linked by the magnetic field produced by one coil, called a transmitter, and detected by another coil, called a receiver.

FIG. 1 illustrates an example system suitable for wide-area energy distribution. In the example illustrated, energy is distributed by a plurality of magnetic resonant couplings arranged in a hybrid mesh.

System 100 provides a solution to problems associated with point-to-point based power transfer. Typically, a point-to-point system suffers short transfer distance (an effective transfer distance is approximately three times the diameter of the coil) and low transfer efficiency at a far range (range is approximately 6~10 times the diameter of the coil). By way of example, a typical point-to-point system may provide a 40% transfer efficiency over a 2 m distance for transmitter/receiver coil diameter of 60 cm. With such a system, the energy transfer at far range (e.g. room size of 4 m) is negligible.

The present subject matter provides a solution to enable a battery-less, wireless application using a wide-area power distribution having high transfer efficiency. One example of such a system can include a sensor network. Another example can include a mesh network of resonant couplings suitable for enabling a plurality of wireless charging stations for deployment in commercial buildings such as factories and office buildings. A charging system, as such, can be used with hand-held mobile devices, such as cellular telephones and smart appliances, and can include multiple line-power transmitters and passive receivers configured as both relays and end power suppliers. The present subject matter can also be used in low-power wireless sensor networks. In addition, the wireless energy transfer technology described herein may be deployed in a variety of commercial, military, and industrial applications. Furthermore, an example of the present subject matter may be suitable for applications in which a dense network of infrastructure is unavailable. For example, the present subject matter may be used for remote powering of Micro Air Vehicles involving tens of meters in distance of high efficiency energy transfer. Other applications are also contemplated, including those not requiring line-of-sight visualization and precise tracking.

One example can also be used in conjunction with other technologies to provide long term battery-less operation. For example, a storage device such as a supercapacitor, can provide relatively high density storage and is well-suited for portable applications. In addition, one example can be configured for use with an energy harvester. An energy harvester can include a solar cell, a piezoelectric generator, or a small turbine device.

Figure 2A:
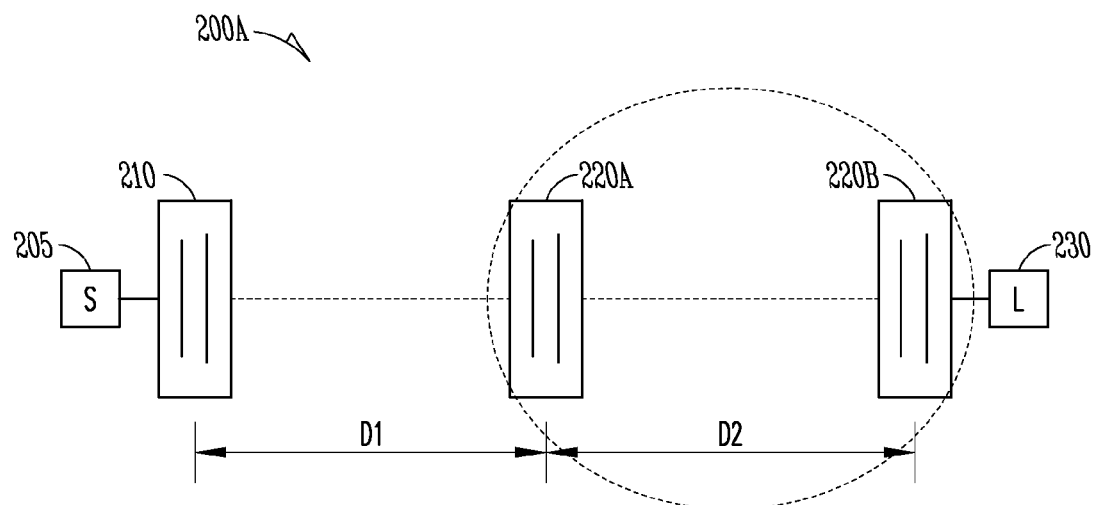
FIG. 2A illustrates a chain of couplers according to one example.

FIG. 2A illustrates a portion of a system, such as that shown in FIG. 1. The system includes a linear chain 200A including supply 205, coupler 210, coupler 220A, coupler 220B, and load 230.

Supply 205 is connected to coupler 210 which may be viewed as a transmitter coil. Supply 205 can include an alternating current source, such as that derived from a metered line service or can include a signal generator and a power amplifier. Coupler 210, in this example, is an active coil or other type of active element.

The couplers shown in the figure are depicted by a radial view of a wound coil having a diameter that is greater than the axial length, however, any particular coupler can have a variety of configurations.

Load 230 is connected to coupler 220B which may be viewed as a receiver coil. Load 230 can include a wireless device, such as a handheld cellular telephone or computer device. Coupler 220B, in this example, is a passive coil or other type of passive element. The resonant frequency of coupler 210, 220A, and 220B are all the same or sufficiently close to provide good magnetic coupling.

Intermediary coupler 220A can also include a coil and in the example illustrated, is a passive element. In the figure, a distance between coupler 210 and coupler 220A is denoted as D1 and a distance between coupler 220A and coupler 220B is denoted as D2. Coupler 220A serves as a relay to propagate the magnetic coupling. Any number of intermediary couplers can be located between active couplers.

In this example, passive coupler 220A, is located roughly midway between the transmit coupler 210 and the receiver coupler 220B, and serves to extend the transfer distance beyond the domain of strong coupling. The scope of the domain of strong coupling is described elsewhere in this document.

In the example shown, the coils of chain 200A are aligned co-axially or co-linearly, however the couplers can satisfactorily transfer energy with an angular offset of approximately 15 degrees or more from co-linear.

Experimentally it can be shown that the energy transfer efficiency for the first hop, that is, through distance D1, is 40%. The overall energy transfer efficiency for the two hops, that is through distance D1+D2, is 35%. In this example, coupler 220B is well beyond the strong coupling region.

The two hop energy transfer efficiency (over a distance of D1+D2=4 m, as in the example shown) is not the product of two individual one hop efficiencies, that is 40%*40%=16%. Rather, the two hop efficiency is approximately 35%/40%, or 87.5%, of the efficiency that a one hop transfer could achieve.

Figure 2B:
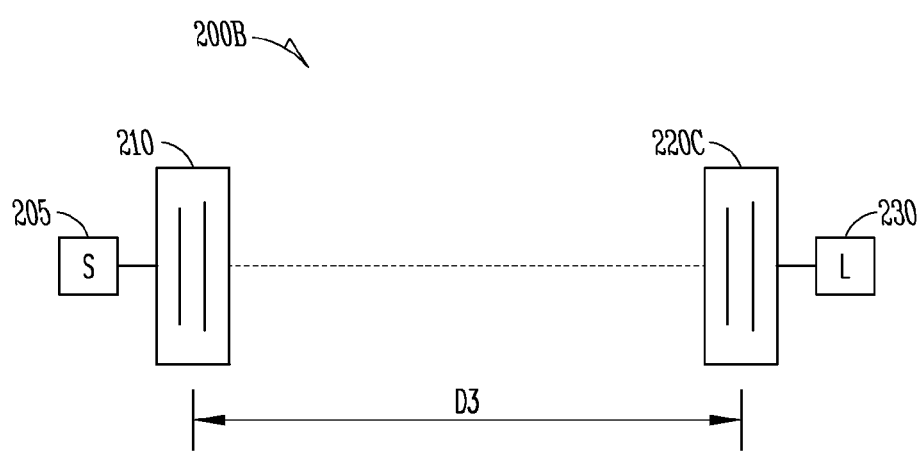
FIG. 2B illustrates a pair of couplers according to one example.

One theory holds that the middle coil, that is coupler 220A, and the last coil, that is coupler 220B (both of which are encircled by a dashed line oval in the figure) together form a large resonant, virtual coil, as modeled by coupler 220C shown in chain 200B of FIG. 2B. Coupler 220C directly couples with coupler 210 over a distance of approximately D3=2 m. Energy losses (radiative and resistive losses) in coupler 220A are approximately 10% of the induced energy in that coil. Together, the two hop energy transfer efficiency is about 10% less than the one hop efficiency but with doubled transfer distance.

A mathematical model can also be used to explain the observations. The governing equations for this physical process are the Coupled Mode Theory (CMT) equations, as follows:

$$\frac{da_1}{dt} = -(i\omega + \Gamma)a_1 + i\kappa_{12}a_2$$

$$\frac{da_2}{dt} = -(i\omega + \Gamma)a_2 + i\kappa_{12}a_1 + i\kappa_{23}a_3$$

$$\frac{da_3}{dt} = -(i\omega + \Gamma)a_3 + i\kappa_{23}a_2$$

Where $\alpha_i$ is magnitude of electric field at coil i, $\Gamma$ is the energy loss rate for each coil and $\kappa_{ij}$ the coupling coefficient between coil i and j. Since the configuration is symmetric, all coupling coefficients in the equations are the same. The coupling between coupler 210 and coupler 220B can be ignored since the distance is 4 m, a dimension far beyond the strong coupling region.

The energy transfer efficiency calculations presented herein are based on an example, such as that shown in chain 200A, in which each coil is helical in shape and has a loop diameter of 60 cm, an inter-loop spacing of h=20 cm, and is formed of copper wire having a diameter a=3 mm with the number of turns n=5.25. In addition, assume D1=D2=2 m.

Figure 3:
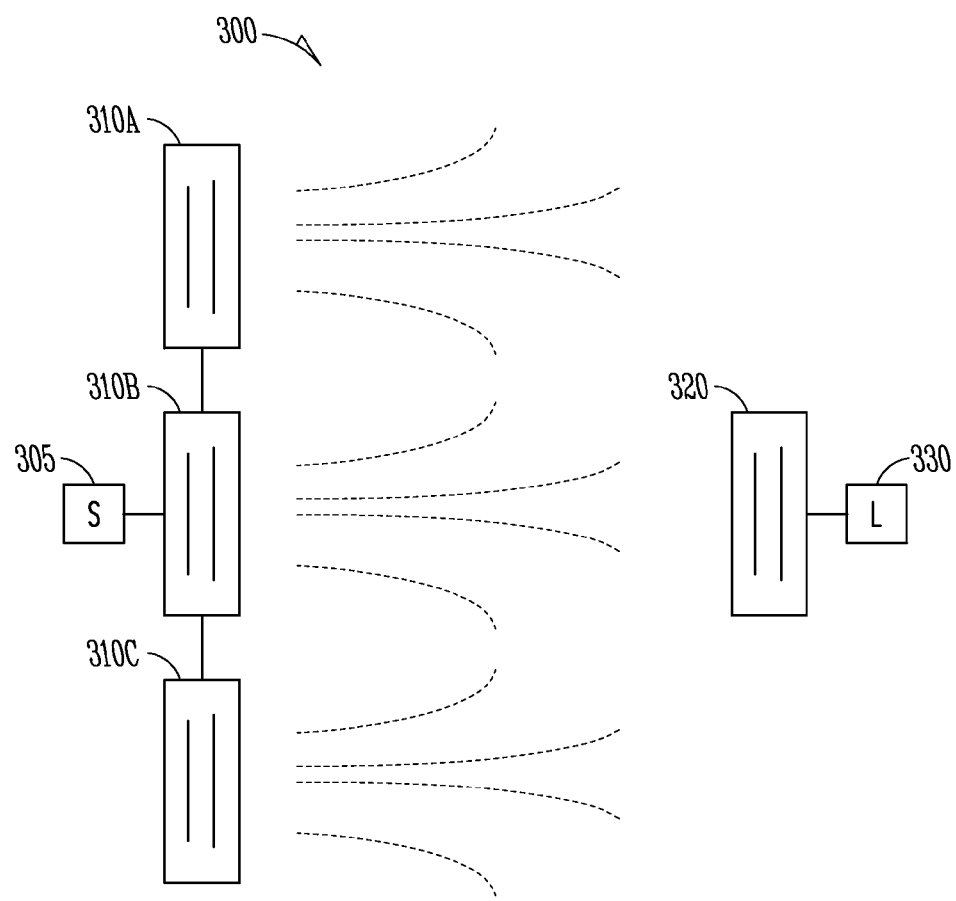
FIG. 3 illustrates an array of couplers according to one example.

An example of the present subject matter can be configured as a magnetic resonant phased array for long range wireless energy transfer, as shown in FIG. 3.

FIG. 3 can be viewed as a stand-alone configuration for wireless energy transfer range extension or as a portion of a meshed system, such as that shown in FIG. 1. FIG. 3 illustrates portion 300 including supply 305, coupler 310A, coupler 310B, coupler 310C, coupler 320, and load 330.

Supply 305 is in communication with each of coupler 310A, coupler 310B, and coupler 310C, all of which may be viewed as transmitter coils. Supply 305 can include an alternating current source, such as that derived from a metered line service or can include a signal generator and a power amplifier. Coupler 310A, coupler 310B, and coupler 310C, in this example, are active coils or other type of active elements.

Load 330 is connected to coupler 320 which may be viewed as a receiver coil. Load 330 can include a wireless device, such as a handheld cellular telephone or computer device. Coupler 320, in this example, is a passive coil or other type of passive element. The resonant frequency of coupler 310A, coupler 310B, coupler 310C, and coupler 320 are all the same.

Couplers 310A, 310B, and 310C are synchronized, magnetic resonant transmitters and can be viewed as a Magnetic Resonant Phased Array (MRPA). The multiple couplers of the MRPA can provide a focused, magnetic field in far field suitable for long range wireless energy transfer. The MRPA can provide higher efficiency than point-to-point transfer and without the need of networked infrastructure, line-of-sight, and precise position tracking.

With reference to FIG. 3, the magnetic field transmitted by couplers 310A, 310B, and 310C is received on the receiving side, at coupler 320. The received field can be described as:

$$\vec{B}(t) = \sum_{i=1}^{n} \vec{B}_i(t)$$

$$= \sum_{i=1}^{N} B_{i0}\cos(wt + \phi_i)\hat{B}_i$$

$$= B\cos(wt + \phi)\hat{B}$$

The array of transmitters (couplers 310A, 310B, and 310C) and the receiver (coupler 320) all have the same resonant frequency, here denoted ω. The phase differences among the transmitters are synchronized and are adjusted to steer the energy projection in designated remote areas to produce a phased array antenna. A controller, located in supply 305 or distributed throughout any or all of couplers 310A, 310B, and 310C, provides a synchronizing signal on which the transmitted energy is radiated. The relative phases of the multiple transmitters are adjusted to provide a reinforced signal at a location of the receiver.

Efficiency over long range can be evaluated using a mathematical model based, again, on the CMT. In this case:

$$\frac{da_1}{dt} = -(i\omega + \Gamma)a_1 + i\kappa_{14}a_4$$

$$\frac{da_2}{dt} = -(i\omega + \Gamma)a_2 + i\kappa_{24}a_4$$

$$\frac{da_3}{dt} = -(i\omega + \Gamma)a_3 + i\kappa_{34}a_4$$

Where, $\alpha_i$ is magnitude of the electric field at coil i, and coil 1, 2, 3 are the transmitters (corresponding to coupler 310A, coupler 310B, and coupler 310C) and coil 4 (coupler 320) is the receiver; Γ is the energy loss rate for each coil and $\kappa_{ij}$ the coupling coefficient between coil i and j. For these calculations, assume no coupling among the transmitters and assume perfect phase synchronization among the transmitters.

Consider a magnetic resonant phased array system including an array of 32 transmitters and covering a distance of up to 6 meters using coils having a diameter of 60 cm. In this case, the L/D~10 and the receiver is located in a far field where magnetic resonant strong coupling is nonexistent.

For comparison purposes, the efficiencies for the generic point-to-point transfer can be shown to be 1.3% for L=5.53m, 4.8% for L =4.41m, and 14.7% for L=3.56m.

Simulation analysis shows that MRPA can enhance transfer efficiency in long range where generic point-to-point transfer has low efficiency. For example, in the L=5.53m case, the enhancement ratio is almost proportional to the number of transmitters. The enhancement ratio is 17.81 for an array of 32 transmitters.

FIG. 3 illustrates three transmitters arranged in a phased array configuration for magnetic resonant energy transfer. In other examples, two or more transmitters can be arranged in a phased array.

The phases of the multiple transmitters are synchronized to project a magnetic field over a long distance (beyond the strong coupling region) and without infrastructural support and line-of-sight.

Figure 4:
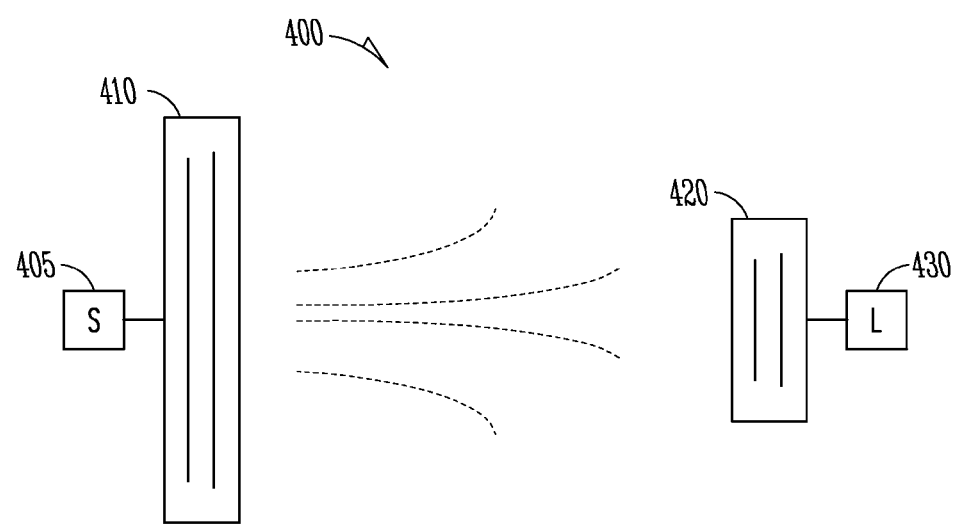
FIG. 4 illustrates a pair of couplers according to one example.

FIG. 4 can be viewed as a portion of a system such as that shown in FIG. 1. The figure illustrates portion 400 including supply 405, coupler 410, coupler 420, and load 430.

Supply 405 is similar to supply 305 and load 430 is similar to load 330. In In this example, the transmitter coupler diameter is larger than the diameter of the receiver coupler and thus, the system is asymmetric. The asymmetric configuration allows for a reduced form factor. Asymmetry refers to a comparison as to the transmitter coupler and the receiver coupler. Parameters other than coil diameter can also be adjusted to provide asymmetry, including the length, the spacing of the individual windings, the core materials and other factors. In one example, the couplers are asymmetric and have differing form factors. For example, a large transmitter coupler, as shown in the figure, can be used with a smaller receiver coupler and still provide good magnetic coupling over a distance.

The transmit efficiency and range is a function of the size of the effective diameter. In general, a longer transmission distance requires larger transmitter size. With matching transmit and receive coils, each having 60 cm effective diameter, the results are comparable if the transmitter has a diameter of 80 cm (and length of 8 cm axially) and receiver has a diameter of 30 cm (and length of 5 cm axially), then the efficiency remains very nearly the same as that of 2 m range for matching 60 cm coils.

With reference to FIG. 4, the governing equations for resonant coupling between the coil of coupler 410 and the coil of coupler 420 are:

$$\frac{da_1}{dt} = -(i\omega + \Gamma_2)a_1 + i\kappa a_2$$

$$\frac{da_2}{dt} = -(i\omega + \Gamma_2)a_2 + i\kappa a_1$$

where, $\alpha_i$ is magnitude of the electric field at coil i. Coil 1 (coupler 410) denotes the transmitter and coil 2 (coupler 420) is the receiver. $\Gamma_i$ is the energy loss rate for each coil and κ the coupling coefficient between coil 1 and 2.

Strong coupling results when the distance/diameter ratio is around two. Energy transfer over a longer distance, requires a proportional increase in the size of transmitters and receivers.

With asymmetric sizing (as illustrated shown in FIG. 4) of the transmitter and receiver coils, the effective diameter of this transmission can be larger than the physical diameter of the receiver due to more concentrated magnetic field generated from the large transmitter. An asymmetric configuration allows form factor reduction in receiver design without sacrificing transmission distance and efficiency.

Figure 5:
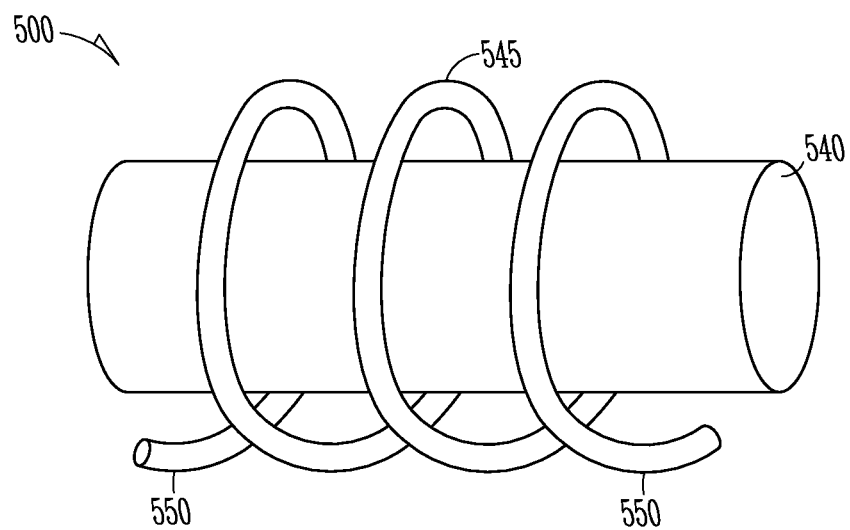
FIG. 5 illustrates a model of a coupler according to one example.

FIG. 5 can be viewed as a model of a portion of a system such as that shown in FIG. 1. FIG. 5 illustrates coil 500 which can be part of a coupler (transmitter, receiver, passive or active) described elsewhere in this document. Coil 500 can include a plurality of windings, such as winding 545 arranged about the length of a core 540. Core 540, in one example, includes a ferromagnetic material, such as ferrite. Winding 545 includes a electrical conductor, such as copper or a superconductor material. For a passive coupler, ends 550 remain unconnected or connected to a load. For an active coupler, ends 550 can be coupled to a supply. With reference to FIG. 1, active couplers 110A, 110B, and 110C have coil ends terminated by a rectangular element representing other circuitry and passive couplers 120A, 120B, 120C, and 120D have coil ends terminated by an open circuit represented by a gap.

An example of the present subject matter is configured to exploit the weak coupling effect with efficiency enhancement derived from high conductivity coil materials. For example, a superconductive coil material may provide satisfactory energy transfer results.

As noted earlier, the governing equations for resonant coupling between two coils are:

$$\frac{da_1}{dt} = -(i\omega + \Gamma_1)a_1 + i\kappa a_2$$

$$\frac{da_2}{dt} = -(i\omega + \Gamma_2)a_2 + i\kappa a_1$$

where, $\alpha_i$ is magnitude of the electric field at coil i. Again, coil 1 denotes the transmitter and coil 2 denotes the receiver. $\Gamma_i$ is the energy loss rate for each coil and $\kappa$ the coupling coefficient between coil 1 and 2.

Strong coupling requires $\kappa/\sqrt{\Gamma_1\Gamma_2} \gg 1$

Thus the ratio of transmission distance to transmitter diameter is typically on the order of two with efficiency at the level of 40%. However, experimentally it can be shown that when the distance is extended such that the ratio reaches 10, the efficiency is within 2%, based on weak resonant coupling between transmitter and receiver, which only requires: $\kappa/\sqrt{\Gamma_1\Gamma_2} \sim 1$ The efficiencies in weak coupling can be further enhanced through use of high-conductivity material in coil design since $\Gamma = R_{total}/2L$ For example, a higher conductivity material reduces R in the coil and thus reduces $\Gamma$.

The weak coupling efficiency can be further enhanced by providing ferromagnetic cores in the transmitter and receiver, which reshape the magnetic field to better align with the axial direction, thus providing a higher coupling coefficient $\kappa$.

At bottom, the figure of merit $\kappa/\sqrt{\Gamma_1\Gamma_2}$ can be improved in the weak coupling region.

The various examples shown herein can be combined in different combinations to provide the energy transfer performance desired.

Figure 6:
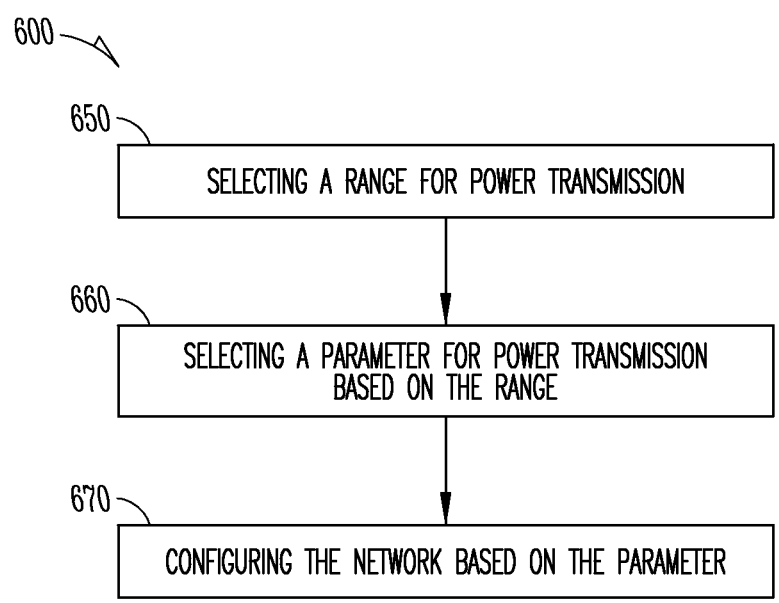
FIG. 6 illustrates a method according to one example.

FIG. 6 illustrates method 600 according to one example. Method 600 includes, at 650, selecting a range for wireless power transmission from a power supply to a load. Selecting a range can include selecting dimensions of a room or facility, or dimensions of a communication network in which power is to be transmitted. The load is coupled to a receiver coil located within the range of at least one element of a plurality of elements of a power transmission network. Each element of the power transmission network has an energy transfer coil and at least one element is coupled to the power supply.

At 660, method 600 includes selecting a parameter for the power transmission network based on the range. An example of a parameter might include a ratio of dimensions as to the diameter of a transmit coil and the diameter of a receive coil. In addition, selecting the parameter might include adjusting a relative phase among a plurality of transmitters based on transmitter spacing and energy transmission distance, or can include selecting a core material for a coil. The energy transmit coils and the receiver coils having a common resonance frequency.

At 670, method 600 includes configuring the power transmission network based on the parameter. The power transmission network is configured to magnetically couple energy to the receiver coil.

Other examples are also included. For example, configuring the power transmission network can include selecting a form factor for an element, such as a transmitter element or a receiver element. As another example, configuring the power transmission network can include synchronizing a phase between two elements of the power transmission network. Furthermore, configuring the power transmission network can include selecting a position for an active element of the power transmission network and selecting a position for a passive element of the power transmission network. In addition, configuring the power transmission network can include selecting a position for a passive element of the power transmission network such that the passive element magnetically couples with at least one active element of the power transmission network. Furthermore, selecting the parameter for the power transmission network can include selecting an energy transfer efficiency rate.

Figure 7:
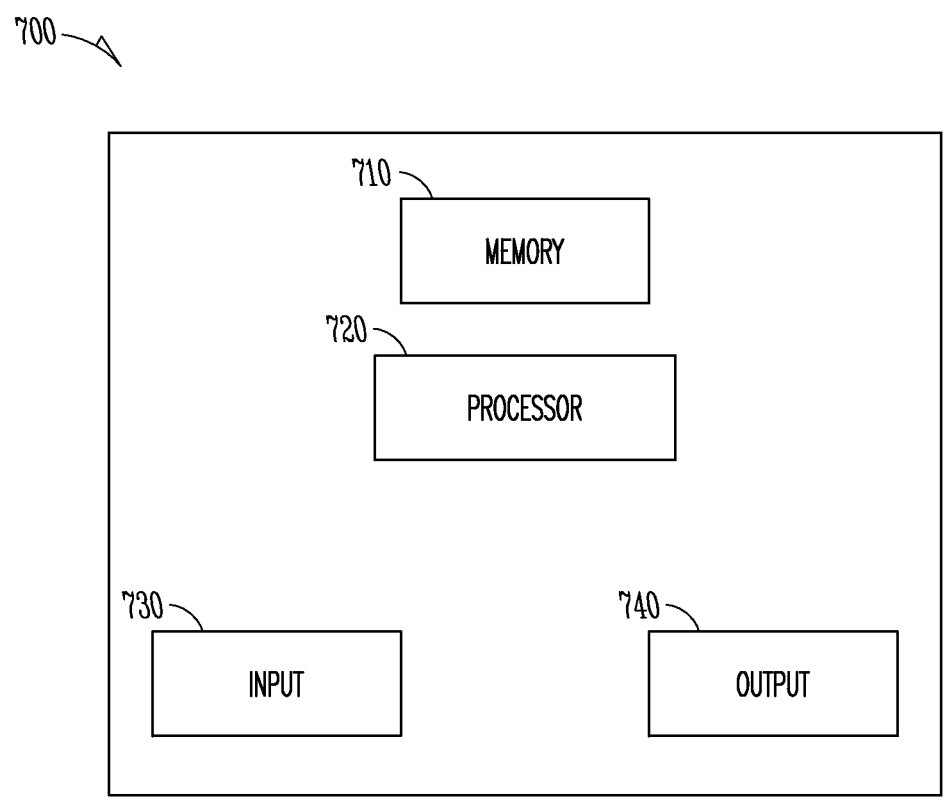
FIG. 7 illustrates a block diagram according to one example.

FIG. 7 illustrates a block diagram of system 700 according to one example. System 700 can include a computer system configured to execute programming according to various methods, including those described herein. A general computing device in the form of a computer, such as system 700, may include a processor 720 and memory 710. Memory 710 can include removable storage or non-removable storage and may include volatile memory and non-volatile memory. System 700 may include, or have access to, a computing environment that includes a variety of computer-readable media. Memory 710 can include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. System 700 may include, or have access to, a computing environment that includes input 730 and output 740. One or both of input 730 and output 740 can include a communication connection to enable the exchange of data, information, or instructions in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions to execute methods and algorithms described herein may be stored on a computer-readable medium such as illustrated as memory 710 executable by processor 720 of system 700. A hard drive, CD-ROM, and RAM are some examples of articles including a computer-readable medium.

Additional Notes and Examples

One example of the present subject matter includes a system having an active energy transfer coil adapted to be coupled to a power supply and a first passive energy transfer coil. The first passive energy transfer coil is magnetically coupled at a desired distance from the active energy transfer coil to receive electromagnetic energy from the active energy transfer coil and configured to further transfer energy to devices when magnetically coupled, wherein the passive energy transfer coil extends an effective distance of the active energy transfer coil.

In addition, one example further includes a second passive energy transfer coil magnetically coupled to the first passive energy transfer coil. The second passive energy transfer coil is configured to receive magnetic energy primarily from the first passive energy transfer coil and to further transfer energy to at least one device when the device is present.

In one example, the active and passive energy transfer coils have the same resonant frequency.

In one example, the first and second passive energy transfer coils form a virtual resonant coil encompassing the first and second passive energy transfer coils facilitating increased energy transfer to at least the second passive energy transfer coil from the active energy transfer coil.

In one example, the first and second passive energy transfer coils extend and effective distance of energy transfer from the active energy transfer coil to at least four meters.

In one example, the energy is recycled between the energy transfer coils absent a device receiving energy from at least one of the energy transfer coils. In one example, the energy transfer coils are helical in shape.

In one example, the energy transfer coils are formed of material including copper.

One example includes a system including a plurality of active energy transfer coils adapted to be coupled to a power supply and a plurality of passive energy transfer coils magnetically coupled at a desired distance from the active energy transfer coils. The passive energy transfer coils are each configured to receive electromagnetic energy from at least one active energy transfer coil or a neighboring passive energy transfer coil to extend an effective energy transfer range of the active energy transfer coils.

In one example, the plurality of active energy transfer coils and passive transfer coils are positioned relative to each other to form a mesh to optimize energy transfer about the mesh.

The above detailed description includes references to the accompanying drawings, which form a part of the detailed description. The drawings show, by way of illustration, specific embodiments in which the invention can be practiced.

These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile tangible computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and other storage devices.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The claimed invention is:

1. A system comprising:
a controller configured to access a selection for a range of power transmission, the controller configured to select a parameter for the power transmission based on the range; and
a network including at least two active energy transfer coils, a first passive energy transfer coil, and a second passive energy transfer coil, the at least two active energy transfer coils configured to couple with a power supply, the at least two active energy transfer coils having an active coupling range; and
the first passive energy transfer coil magnetically coupled to at least one of the at least two active energy transfer coils and located within the active coupling range, the first passive energy transfer coil having a passive coupling range, the first passive energy transfer coil configured to provide energy to a first device located within the passive coupling range and based on energy received from at least one of the at least two active energy transfer coils, wherein at least one of the active coupling range and the passive coupling range exceeds a distance of strong coupling, and the second passive energy transfer coil located within at least one of the active coupling range and the passive coupling range, the second passive energy transfer coil configured to receive energy from at least one of the at least two active energy transfer coils and the first passive energy transfer coil and provide energy to a second device based on the received energy, wherein a phase between two of the at least two active energy transfer coils is synchronized , and wherein the network is configured based on the parameter.

2. The system of claim 1 wherein a resonant frequency of the at least one active energy transfer coil is substantially equal to a resonant frequency of the first passive energy transfer coil.

3. The system of claim 1 wherein a form factor of an active energy transfer coil exceeds a form factor of a receiver coil coupled to the device.

4. The system of claim 1 wherein at least one active energy transfer coil includes a copper conductor.

5. The system of claim 1 wherein at least one active energy transfer coil includes a ferromagnetic core.

6. A method comprising:
    selecting a range for wireless power transmission from a power supply to a load, the load having a receiver coil located within the range of at least one element of a plurality of elements of a power transmission network, each element having an energy transfer coil and at least one element coupled to the power supply, the plurality of elements including at least two active energy transfer coils, a first passive energy transfer coil, and a second passive energy transfer coil;
    selecting a parameter for the power transmission network based on the range, the energy transfer coils and the receiver coil having a common resonance frequency; and
    configuring the power transmission network based on the parameter, the power transmission network configured to magnetically couple energy to the receiver coil, and wherein the range exceeds a distance of strong coupling, and wherein configuring the power transmission network includes synchronizing a phase between two elements of the power transmission network.

7. The method of claim 6 wherein configuring the power transmission network includes selecting a form factor for an element.

8. The method of claim 6 wherein configuring the power transmission network includes selecting a position for an active element of the power transmission network and selecting a position for a passive element of the power transmission network.

9. The method of claim 6 wherein configuring the power transmission network includes selecting a position for a passive element of the power transmission network such that the passive element magnetically couples with at least one active element of the power transmission network.

10. The method of claim 6 wherein selecting the parameter for the power transmission network includes selecting an energy transfer efficiency rate.

* * * * *